(12) United States Patent
Cohen et al.

(10) Patent No.: US 12,001,947 B2
(45) Date of Patent: Jun. 4, 2024

(54) ULTRA-WIDE DATA BAND OPTICAL PROCESSOR

(71) Applicant: Cognifiber Ltd, Rosh Ha'Ayin (IL)

(72) Inventors: Eyal Cohen, Gedera (IL); Zeev Zalevsky, Rosh Ha'Ayin (IL); Maya Yevnin, Tel Aviv (IL)

(73) Assignee: COGNIFIBER LTD., Rosh Ha'Ayin (IL)

( * ) Notice: Subject to any disclaimer, the term of this patent is extended or adjusted under 35 U.S.C. 154(b) by 59 days.

(21) Appl. No.: 17/709,894

(22) Filed: Mar. 31, 2022

(65) Prior Publication Data

US 2022/0327372 A1  Oct. 13, 2022

Related U.S. Application Data

(60) Provisional application No. 63/291,807, filed on Dec. 20, 2021, provisional application No. 63/168,684, filed on Mar. 31, 2021.

(51) Int. Cl.
*G06N 3/067* (2006.01)
*H04B 10/80* (2013.01)

(52) U.S. Cl.
CPC ......... *G06N 3/0675* (2013.01); *H04B 10/801* (2013.01)

(58) Field of Classification Search
None
See application file for complete search history.

(56) References Cited

U.S. PATENT DOCUMENTS

| | | | |
|---|---|---|---|
| 2004/0020873 A1* | 2/2004 | Henderson | H05K 7/183 312/265.4 |
| 2004/0105451 A1* | 6/2004 | Boduch | H04J 3/14 370/401 |
| 2012/0147757 A1* | 6/2012 | Zhang | H04B 10/07 370/244 |

(Continued)

FOREIGN PATENT DOCUMENTS

| | | |
|---|---|---|
| WO | 2017033192 A1 | 3/2017 |
| WO | 2017033197 A1 | 3/2017 |
| WO | 2019186548 A1 | 10/2019 |

OTHER PUBLICATIONS

Eyal Cohen, "Neural networks within multi-core optic fibers", Sci. Rep. 6, 29080; doi:10.1038/srep29080 (2016).

(Continued)

*Primary Examiner* — Darren E Wolf
(74) *Attorney, Agent, or Firm* — CANTOR COLBURN LLP (57) ABSTRACT

A photonic computing system is presented. The system comprises an arrangement of multiple photonic processing units having input and output ports, each of the photonic processing units comprising an array of photonic guiding units configured to define propagation conditions for multiple light fields associated with one or more optical processing tasks. The system also comprises a plurality of optical connectors, each of the optical connectors performing light field to light field coupling between the input and output ports of the photonic processing units, thereby providing a network of communicating processing units. The photonic computing system can be configured as a module enabling its housing in a network rack.

21 Claims, 6 Drawing Sheets

(56) References Cited

U.S. PATENT DOCUMENTS

2012/0200854 A1* 8/2012 Bland-Hawthorn ........................
G02B 6/4215
356/300
2019/0004260 A1* 1/2019 Hangebrauck ....... G02B 6/3894
2019/0294199 A1 9/2019 Carolan
2020/0003948 A1* 1/2020 Zalevsky ................. G02B 6/43
2021/0027154 A1* 1/2021 Zalevsky ......... G06V 30/18057

OTHER PUBLICATIONS

T. A. Birks, I. Gris-Sánchez, S. Yerolatsitis, "The photonic lantern," Conference on Lasers and Electro-Optics, San Jose California (2014), paper SM2N.3.
European Search Report for corresponding application EP22165781; Report dated Sep. 1, 2022.

* cited by examiner

ULTRA-WIDE DATA BAND OPTICAL PROCESSOR

TECHNOLOGICAL FIELD AND BACKGROUND

The present invention is in the field of photonic processors, which are particularly useful in optical data communication, as well as optical computation devices suitable for use in optically integrated artificial neuron networks.

Optical/photonic computing utilizes manipulation on visible or infrared light to perform computation processes. Optical computing enables faster computation rates as compared to electronic systems, owing to the fact that manipulations on light pulses may be faster and allows transmission of higher bandwidth of information.

Optical computing may deliver low-power, high-speed solutions to real-time machine learning and artificial intelligence (AI) needs, and thus allows for implementation of artificial neural networks (ANNs), which are basically computer systems trained to optimize their performance for automatic data recognition and execution of relevant actions depending on incoming data. A typical ANN system is based on a set of connected units or nodes (artificial neurons); the connections between the nodes can transmit a signal from one node to another. The various inputs to a specific artificial neuron are multiplied by linear weights and the output of the artificial neuron is generated by applying a nonlinear function (like a sigmoid or RelU) on the sum of the weighted inputs with an addition of a bias factor. The artificial neuron receives a signal, processes it, and transmits a resulting signal to artificial neuron(s) connected thereto.

Generally, photonic computing implementations may be based on silicon photonics and photonic integrated circuit platforms or on free space solutions. However, such implementations are limited by phase-noise, heat sensitivity and scaling-dependent inefficiencies. In contrast, fiber optics offer a robust, stable, and well-developed technology that has served optical communications applications with low power and high bandwidth.

For example, WO 2017/033197 to Zalevsky et al. teaches an integrated optical module. The optical module comprises multiple optically coupled channels and enables the use thereof in an Artificial Neural Network (ANN). According to some embodiments the integrated optical module comprises a multi-core optical fiber, wherein the cores are optically coupled.

E. Cohen et al., "Neural networks within multi-core optic fibers", Sci Rep. 2016 Jul. 7; 6:29080 describes a conceptual design for in-fiber optical neural networks. Neurons and synapses are realized as individual silica cores in a multi-core fiber. Optical signals are transferred transversely between cores by means of optical coupling. Pump driven amplification in erbium-doped cores mimics synaptic interactions. Simulations have shown that networks can differentiate between given inputs depending on specific configurations of amplification; and multi-core fiber can serve as building blocks for large-scale small-volume optical artificial neural networks.

GENERAL DESCRIPTION

As indicated above, photonic computing systems provide for reaching far better compute bandwidth and efficiency than electronic counterparts. At the system level any additional modules (such as communication modules, storage modules, cooling modules etc.) to an electronic computing system, consumes additional power without increasing the compute bandwidth and therefor reduces the overall efficiency (measured in operations/watt).

In AI applications there is a clear positive correlation between number of parameters (nodes, connections, layers etc.) and the computing accuracy, as well as the hierarchical generalization capability of the systems. In several embodiments this may relate to saving or loss of human life (i.e. autonomous vehicles, health related AI applications, and safety automation). On the other hand, super computing systems require megawatts and are not energetically sustainable. Therefore, in various applications, in particular AI applications, there is a need for a photonic super computing system with extreme performance and far better efficiency (lower power consumption).

A server size system today normally contains 8-16 processors, while 3-6 of these servers compose a rack (or pod), and a super computing system may consist of dozens and up to more than a hundred such racks (thousands of processors altogether).

As indicated above, coupling of light propagating in photonic guiding units (such as optical fibers and waveguides) may be used for various processing tasks.

The present invention provides a novel solution enabling optical coupling between light fields associated with different propagation conditions in one or more photonic guiding units relating to (being involved in) processing task(s) of an optical/photonic processor, e.g., an artificial optical neuron unit.

In the description below, such a photonic guiding unit is referred to as "fiber" or "opticalfiber", but it should be understood that the principles of the present invention are not limited to the use of fiber-based photonic processors. The invention can also be implemented with other types of waveguides or, generally, photonic guiding units, capable of implementing photonic computing/processing via interaction of light fields.

It should also be noted that for the purposes of the present invention "light fields associated with different propagation conditions" may relate to different propagation modes in multi-mode photonic guiding unit (fibers), and/or different cores of multi-core fiber(s) of either single-mode, few-modes or multi-mode fiber type, and/or different fibers being either single- few- or multi-mode fibers, as well as can support different frequencies.

The technique of the present invention enables a so-called rack configuration of basic functional blocks each formed by an array of the above-described photonic guiding units operable as photonic processors (e.g. fiber-based system), which may be used with any known suitable technology for realization of photonic-type communication or neural network (e.g. multi core based neural network) allowing to obtain a compact realization of an ultra-wide data band processing machine. Such a novel arrangement of photonic processors provides for a very high number of processors (e.g. 1800 or more processors) that can be mounted in parallel in a single rack. The inventors have demonstrated exemplary flows of information, utilization, and programmability of such an arrangement and how it can potentially improve computing efficiency by over six orders of magnitude while achieving supercomputing performance.

The technique of the invention can be implemented using commercially available components to form building blocks (processing units) in a photonic computational neuron, and allows efficient interface with the external world of electronics via conventional optics communication components. The use of the technique of the invention provides projected performance of more than 1,000,000 Tera operations per second (TOPs) and efficiency higher than 1000 TOPs/Watt.

In the description below, the terms "computing unit" and "processing unit" are interchangeably used and refer to an arrangement of photonic guiding units configured for implementing data/signal processing tasks via coupling and interaction between the light fields. Similarly, the terms "computing system" and "processing system" are interchangeably used and refer to a system formed by a plurality/array of computing/processing units with their associated input/output modules.

Thus, according to one broad aspect of the invention, there is provided a photonic computing system comprising: an arrangement of a predetermined number of multiple photonic processing units having input and output ports, each of said photonic processing units comprising an array of photonic guiding units configured to define propagation conditions for multiple light fields associated with one or more optical processing tasks; and a plurality of optical connectors, each of said optical connectors performing light field to light field coupling between the input and output ports of adjacent photonic processing units in said arrangement of the photonic processing units; said photonic computing system thereby providing a network of communicating processing units.

The optical connectors are configured as bridge-like connectors.

The photonic processing units with the optical connectors are arranged in a spaced apart parallel relationship forming together a processor panel, said photonic computing system being thereby configured as a module enabling its housing in a network rack.

In some embodiments, at least one or some of the optical connectors is/are configured for connecting the output port of one processing unit to the input port of another processing unit.

In some embodiments, at least one or some of the optical connectors is/are configured for connecting the output port of one processing unit to the input ports of two or more of other processing units. In this case the output port and input ports of the processing units connected by the at least one optical connector include light splitting and coupling elements.

In some embodiments, at least one or some of the optical connectors is/are configured for preserving one or more properties of the respective light field, e.g. light polarization and/or light spectral properties.

The processing task(s) being performed by the photonic processing unit may be defined by amplification patterns controllably applied on the light fields.

The number of the photonic processing units may be determined by a number of light propagating cores defined by the photonic guiding units. The configuration of the photonic guiding units may be such as to define the number of light propagating cores in accordance with optimized amplification patterns.

The optical connector together with the respective input and output ports of the photonic processing units may be configured and operable to apply the predetermined amplification patterns on the light fields. The optical connector may further include a local controller configured and operable to control the amplification pattern being applied and to control readout of output light.

The photonic processing unit includes a photonic body configured to define two or more of said input ports and two or more of said output ports. In some embodiments, the photonic body has a hexagonal cross-section, whose facets are associated with the input and output ports.

In some embodiments, at least one or some of the input ports comprise an input synchronizing unit, which may include a clock locking utility adapted to perform client-server clock locking, and/or a clock phase alignment utility adapted to perform optical clock-phase delay synchronization.

In some embodiments, at least one or some of the input ports is/are configured and operable to perform wavelength conversion.

In some embodiments, at least one or some of the output ports is/are configured and operable to perform output signal reshaping.

The photonic guiding units are configured to define the light fields of one or more of the following types: multimode light fields, multicore light fields defined by single-mode, multi-mode or combination of both light channels, light fields propagating through erbium doped cores, light fields propagating through photonic crystal fiber-based cores, light fields confined in 2D or 3D photonic crystals.

The photonic processing units may utilize a photonic lantern made by adiabatically merging several single-mode cores into one multimode core.

According to another aspect of the invention, it provides a network rack housing multiple hardware modules comprising one or more photonic computing systems configured as described above.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIGS. 2A-2C exemplify arrangement and operation of multiple basic functional blocks of the photonic computing system of FIG. 1, wherein

FIGS. 6A-6F exemplify fabrication and operation of the photonic computing system of the present invention, wherein

FIGS. 7A-7D exemplify configuration and operation of EDMF-based computing units/basic blocks of the present invention, wherein

DETAILED DESCRIPTION OF EMBODIMENTS

Figure 1:
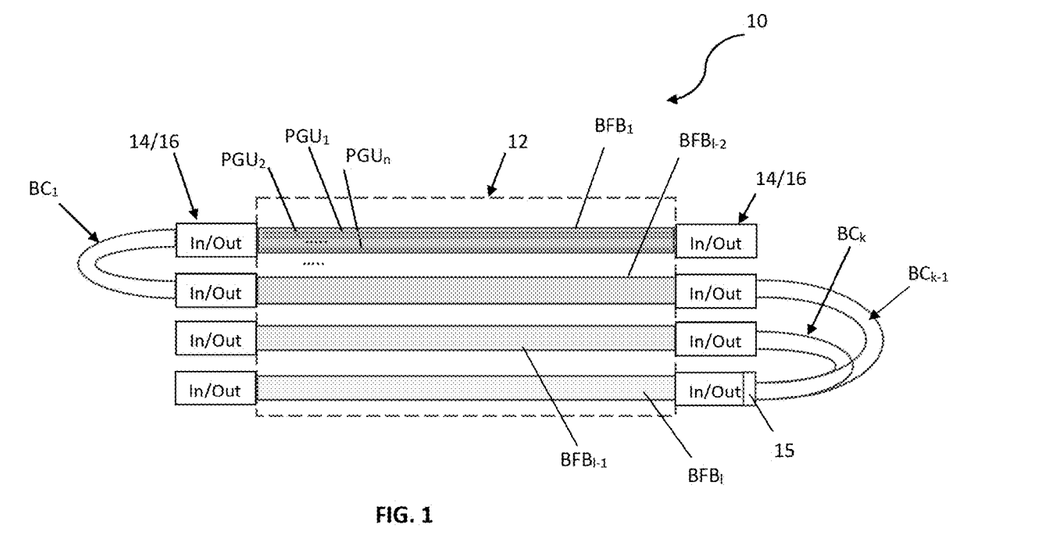
FIG. 1 is a schematic illustration of a photonic computing system of the present invention.

Referring to FIG. 1, there is schematically illustrated a photonic processing/computing system 10 of the present invention configured and operable to implement various data processing tasks/functions. The system 10 may be used as an optical communication system or an optical computing system.

The processing system 10 includes an array/arrangement 12 of a certain number L of multiple basic functional blocks $BFB_1 \ldots BFB_L$, configured as photonic processing units/computing units. Each i-th photonic processing unit $BFB_i$ has its associated input/output ports 14 and 16. Each i-th photonic processing unit $BFB_i$ (basic functional block) is configured and operable to implement one or more computing/processing tasks/functions, and includes a plurality of N photonic guiding units $PGU_1 \ldots PGU_n$ forming together a plurality of light field channels (generally, at least two such channels) configured to define M light field propagation conditions, where M N.

As indicated above, the multiple light channels may be associated with multiple fibers, e.g., single-mode fiber(s) and/or multi-mode fiber(s), and/or single-core or multi-core fibers.

In the description below, the photonic processing unit, as well as arrangement 12 of such units, is at times referred to as fiber arrangement or fiber-based unit. However, as described above, the principles of the present invention relating to novel architecture of the photonic processing system 10 is not limited to fiber-based configuration.

The photonic guiding unit defines at least one light propagation path (core). It should be understood that for the purposes of the present invention, the meaning of the term "light channel" should not be limited to "light of a specific spectrum", as well as should not be limited to a physical light propagation path, but should be interpreted broadly covering also a light field of a specific propagation mode in a multi-mode fiber core.

Thus, for example, the photonic guiding unit may be configured as a fiber unit, where the light field channels are associated with multiple cores of the same fiber and/or multiple modes of the same or different cores (i.e., a wide core supporting a plurality of spatial optical modes). Considering an example in which at least some of the multiple light channels are associated with different light paths (e.g., different fibers or different cores of the same or different fibers), each such light path has a first end for receiving input light and a second end for providing output light. It should be understood that a multi-core fiber, if used, is properly configured to provide desired coupling between the cores.

According to the present invention, the input/output units 14, 16 are configured for collecting light from at least one output of one photonic processing unit and coupling light into associated one or more inputs of one or more adjacent photonic processing units, to implement the related optical processing task. As further shown in FIG. 1, the system 10 includes a plurality of K optical connector(s) $BC_1 \ldots BC_K$, configured as bridge like connectors (light paths) for connecting input/output ports 14, 16 of adjacent photonic processing units. As will be described further below, the photonic processing unit may be associated with multiple input ports and/or multiple output ports.

It should be noted that the bridge-like optical connector may be configured for connecting the output of one photonic processing unit to the input of the other photonic processing unit (i.e. 1×1 optical connection), or may be configured for connecting the output of one photonic processing unit to the inputs of G (G>2) processing units (i.e., 1×G optical connections). In case of 1×G optical connections, the related input/output unit is properly equipped with light splitter(s) and coupler. This is schematically exemplified in FIG. 1 showing that optical connectors $BC_{k-1}$ and $BC_k$ are connecting input port 14/16 of the same photonic processing unit $BFB_l$ to outputs 14/16 of photonic processing unit $BFB_{l-1}$ and $BFB_{l-2}$, respectively. To this end, the input/output port 14/16 of photonic processing unit $BFB_l$ is equipped with light splitter and coupler assembly 15.

It should also be noted that the optical connector may be properly configured to either preserve light polarization or not, as required for a specific optical processing task. Polarization preservation may be implemented by using reflective, diffusing and/or refractive structures or interfaces.

In some embodiments, the optical connector/coupler may be configured to maintain the light field of one or more specific wavelengths (or wavelength ranges), as well as may be properly equipped with wavelength selective splitter. These features may be useful for WDM function.

Figure 2A:
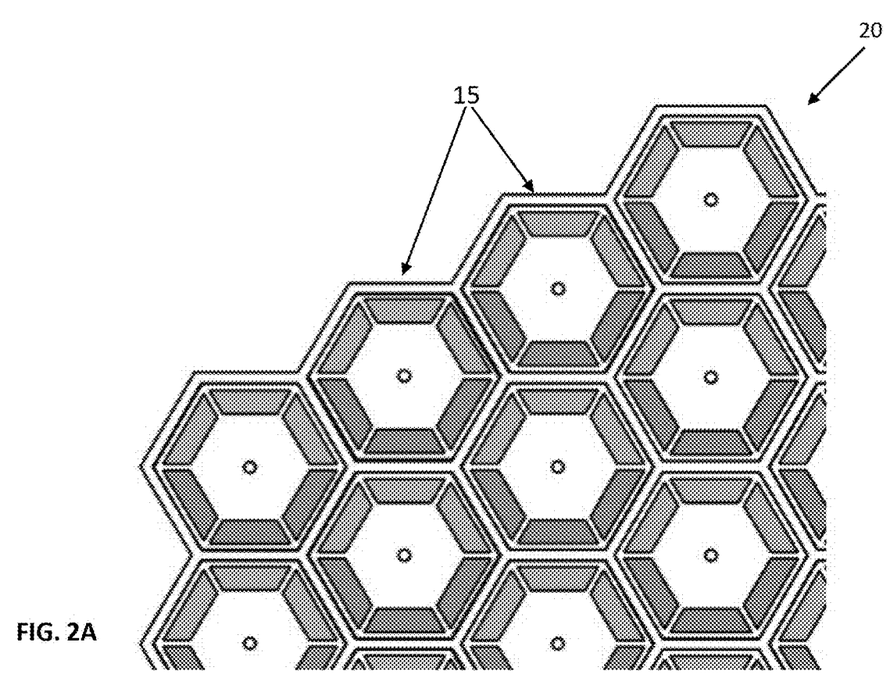
FIGS. 2A and 2C show apart of the photonic processing system formed by a plurality of the basic blocks.
Figure 2B:
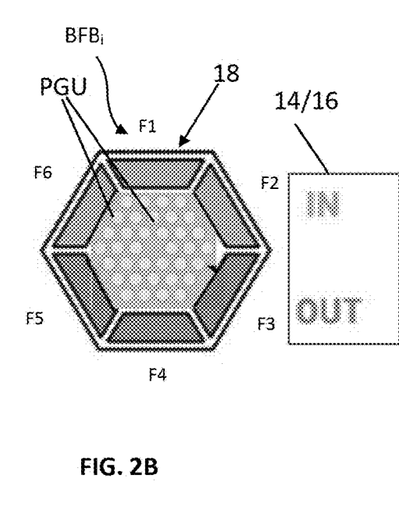
FIG. 2B shows the exemplary configuration of a photonic body of the processing unit containing plurality of photonic guiding units.
Figure 2C:
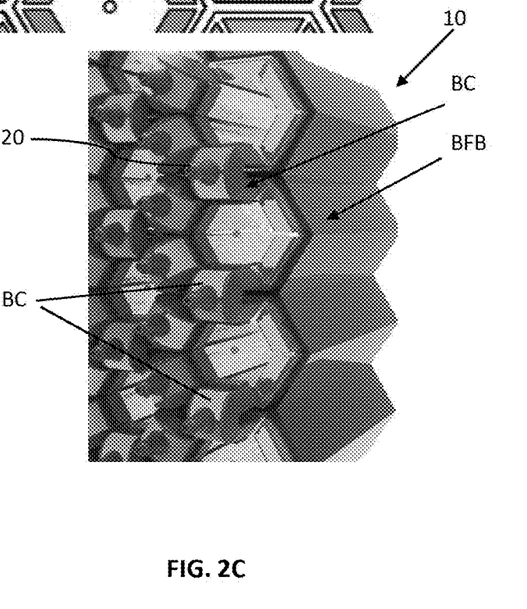

Reference is made to FIGS. 2A-2C exemplifying how the above-described basic blocks are arranged in the photonic processing/computing system. To facilitate understanding, the same reference numbers are used to identify similar components in all the examples described herein.

FIG. 2A schematically exemplifies a part of the photonic processing system 10 formed by a plurality/array of the above-described processing units (basic functional blocks) BFB. FIG. 2B shows more specifically that each processing unit BFB includes the array of photonic guiding units PGU, and each processing unit BFB is associated with the input/output units/ports 14,16. As shown in FIG. 2C, each processing unit BFB is surrounded by other processing units (unless limited by the edge of the entire assembly of processing units) and can communicate with all the surrounding processing units, either receiving from them or transmitting to them light carried information, via the bridge connectors BC.

Preferably, the processing unit has a photonic body 18 of a hexagonal cross-section containing the plurality of photonic guiding units PGU, and external facets F1-F6 of the hexagon are used as input/output ports 14, 16 on both sides of the body 18, such the photonic body 18 is associated with 12 ports. Each port can implement either Input or Output functions and both, signal wavelength pattern, as well as amplification pattern can be injected into the processing unit.

Light coming from each output port enters the U-shaped bridge connector BC. The latter, in its back portion 20 contains electronic cables connected to a local controller which implements control of injected amplification light and the readout of output light (which can be used for training and calibration). The bridge connector BC may include multimode fibers, and pixel-wise weighting device (e.g. based on the use of DMD or LCD technology) that allows flexible manual reconfiguration of the system architecture, or fixed filter that replaces the flexible one after training is completed.

Thus, the photonic processing system 10 forms a network of communicating processing units 15. The number of processing units 15 in the network and their connectivity are bounded by the number of photonic cores defined by the photonic guiding units PGU. However, they are programmable as they depend on the amplification patterns that are optimized during the learning phase of the system. Using amplification for both compute and routing within the processing unit determines the light flow from input ports to output ports. At least one input port and at least one output port are configured by the programmable pattern of amplification. The divergence and convergence of data within the network elements is also governed by amplification patterns.

The approach of the present invention provides a "rack type" configuration of the basic functional blocks BFB, as well as of processing systems 10, i.e. high density of processing units within a limited volume similar to a communication rack (19 inch wide, 2-2.5 m tall). This allows to obtain a compact realization of an ultra-wide data band processor. Also, this technique allows flexible manual reconfiguration of the architecture and complexity of optical processing.

Figure 3:
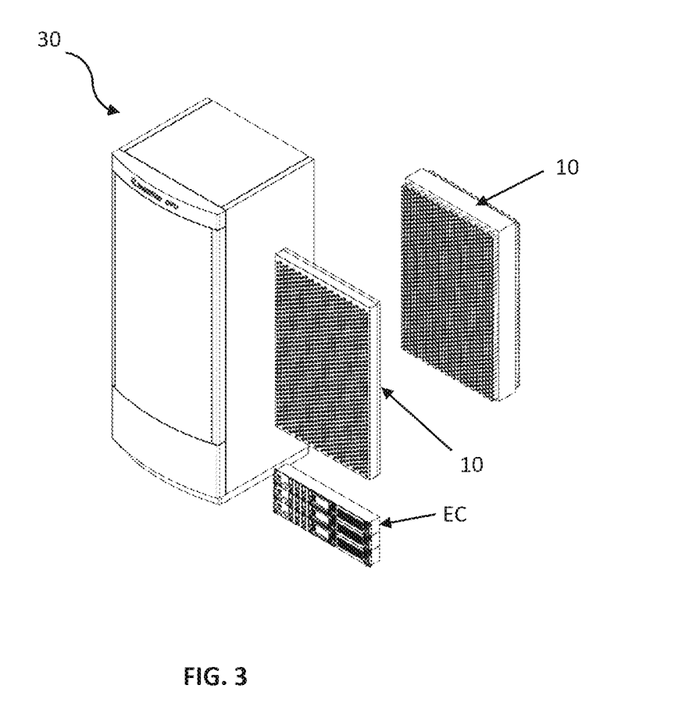
FIG. 3 shows a network rack configured for housing one or more photonic computing systems of the invention.

This is schematically illustrated in FIG. 3 which shows a network rack 30 configured for housing network hardware. The system 10 is configured as a processor panel formed by the above-described processing units with the associated bridge-like connectors arranged in a spaced-apart parallel relationship (matrix arrangement). The system 10 can thus form one of the hardware modules of the network rack. This enables the network rack configuration including one or more photonic processing systems 10, as well as other electronic components EC.

Figure 4:
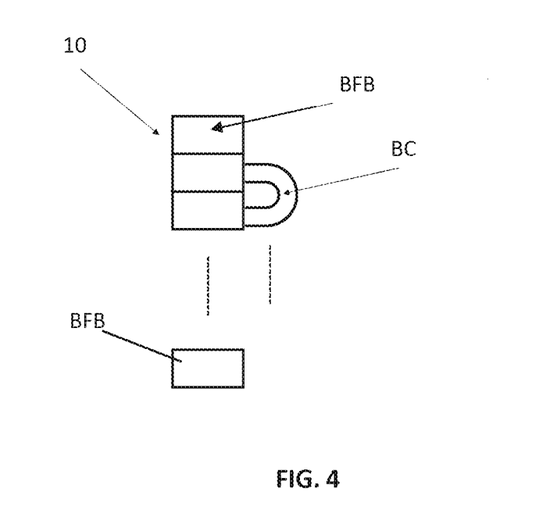
FIG. 4 schematically exemplifies the implementation of the present invention in a multi-core rack configuration of photonic computing system of the invention.

FIG. 4 schematically exemplifies the implementation of the above approach of the present invention in a photonic processing system 10 configured as a so-called multi-core rack utilizing a plurality of fiber-based basic functional blocks (processing units) BFB. The processing unit BFB is configured as a multi-core segment with desired coupling between the cores. Bridge-like optical connectors BC are properly provided for coupling output cores from one input fiber segment to input cores in the other fiber segment.

As indicated above, any known suitable technology for realization of fiber-based communication or neural network (e.g. multi core based neural network) can be integrated into the above described rack configuration allowing to obtain a compact realization of an ultra-wide data band processing machine. Bricks like fiber segments (e.g., multiple cores of multi-core fiber having proper coupling between the cores) such that light flows from input cores towards output cores, can be connected into additional bricks by using the U-shaped optical connector BC performing core to core coupling.

For example, a tunable device, e.g., including liquid crystal based pixels, can be integrated in front of the right cores to perform amplitude/phase modulation on the spatial cores and/or to be constructed as spectral filter as well to allow attenuation of desired spectral bands per each desired core in the brick.

Generally, the processing units BFB that can be used in a photonic processing system 10 of the invention may be of one or more of the following types: multimode based, multicore based (single/multi-mode or combinations thereof), erbium doped glass with or without femtosecond laser scribing (DLW), photonic crystal fiber-based, 2D/3D photonic crystals.

Figure 5A:
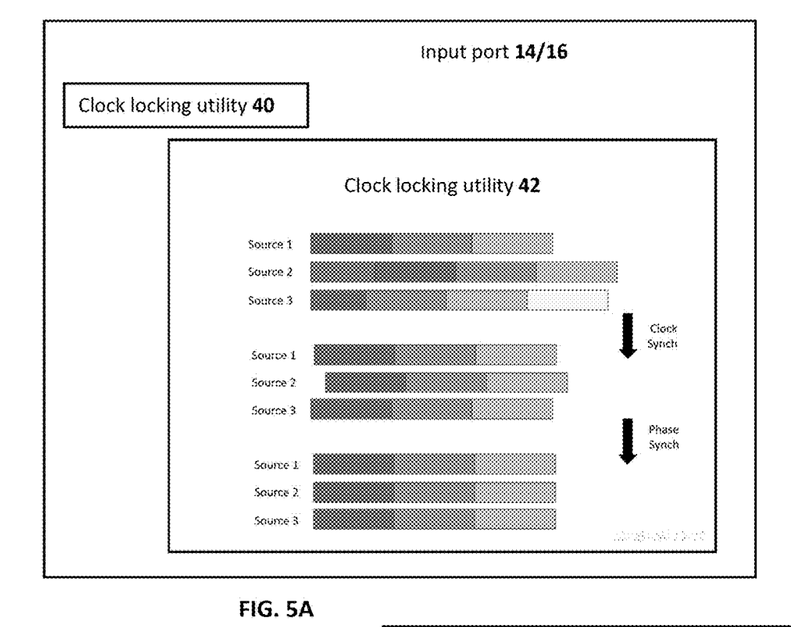
FIGS. 5A and 5B exemplify the configurations of the input port including input synchronizing unit and wavelength converter.

As schematically exemplified in FIG. 5A, the basic block may be properly configured to define input synchronizing unit 14, 16. The input synchronizing unit 14/16 includes a clock locking utility 40 configured to implement client-server clock locking. To this end, back-and-forth protocols with clock reference and counters are used thus providing that all signal sources can be synchronized to the same clock. Also, input synchronizing unit preferably includes a clock phase alignment utility 42 which is configured to provide optical clock-phase delay synchronization. As shown in the figure, optically controlled variable delay mechanism can align clock phase to a certain degree (several percent).

Figure 5B:
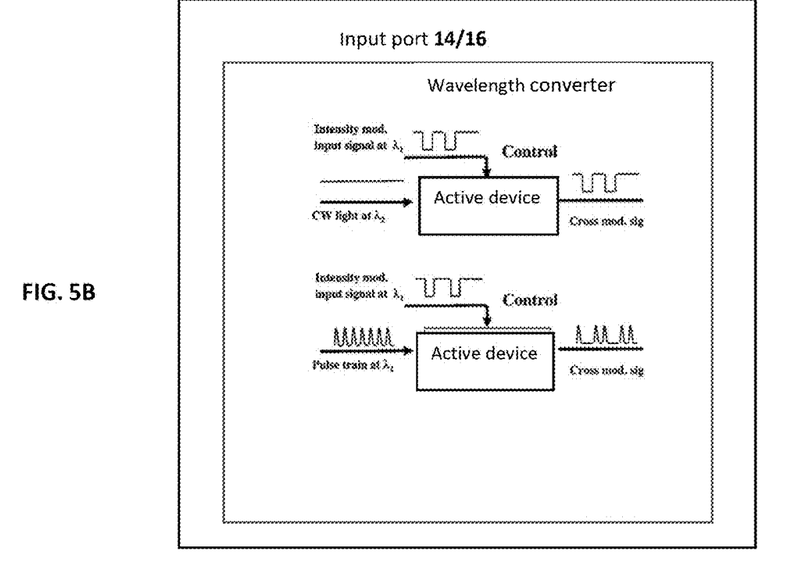

In some embodiments, the input unit 14, 16 is configured to implement wavelength conversion. To this end, signals from separate DWDM frequencies can be converted to a single wavelength to generate desired interactions using the cross-phase modulation phenomenon. Similarly, single wavelength can be converted to various DWDM frequencies to avoid coherence.

This is exemplified illustrated in FIG. 5B. Wavelength conversion can be achieved when two input signals $\lambda_1$ (intensity modulated input) and $\lambda_2$ (being continuous wave (CW signal), or pulse train, or return-to-zero (RZ) signal) are injected together into an active device, such as an Erbium-Doped Fiber Amplifier (EDFA) or Semiconductor Optical Amplifier (SOA). The input signals compete for gain resources (cross gain modulation) or through nonlinear processes such as Kerr effect (cross-phase modulation), four-wave mixing, etc.

In some embodiments, the output unit 14, 16 is configured to implement output pulse reshaping. This may include amplification based on standard Erbium-Doped Fiber Amplifier, and WDM multiplexing using cross-gain modulation optical ADC (converting to digital signals if necessary). The same nonlinear processes described above can be used to imprint a signal pulse shape upon continuous wave source or to reshape an existing pulse. The photonic processing unit BFB suitable to be used in the system of the invention may utilize photonic lantern made by adiabatically merging several single-mode cores into one multimode core. This provides low-loss interfaces between single-mode and multimode systems, where the precise optical mapping between cores and individual modes is not needed. In particular, this may be photonic lantern [e.g. T. A. Birks et al., "The photonic lantern," Adv. Opt. Photonics 7, 107 (2015).], where a fan-in and fan-out components are spliced back to back so that 7 or more input single-mode fibers are adiabatically tapered to form a multimode section which is then adiabatically connected to 7 output single mode fibers.

Data can be injected into the fiber-based photonic processing unit by standard fiber-coupled transceivers (transmitters/receivers), which also act as the receiving unit for the setup. Weights may be supplied by computer controlled variable optical attenuators (VOA), and the output signal is amplified by an Erbium doped fiber amplifier (EDFA).

Figure 6A:
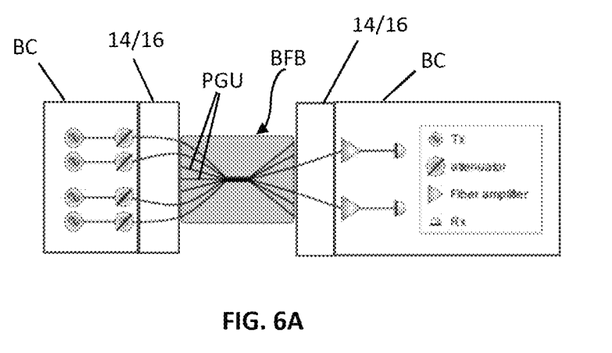
FIG. 6A shows a setup for a single computing unit.
Figure 6B:
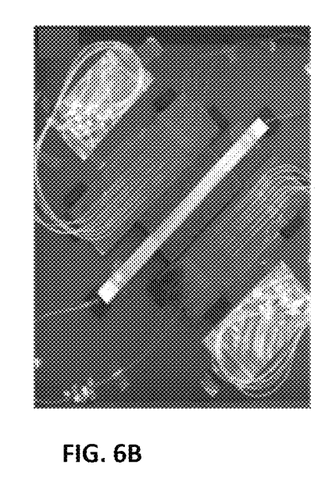
FIG. 6B shows an image of the corresponding fabricated multimode.

Reference is made to FIGS. 6A-6F exemplifying the fabrication and operation of the computing system of the present invention. A setup/module, for a single computing unit BFB is exemplified in FIG. 6A. An image of the corresponding fabricated multimode device is shown in FIG. 6B.

The optical connector BC may be configured to apply predetermined modulation to the light being input/output to/from the photonic processing unit BFB. Such modulation may include linear and/or non-linear amplification pattern(s) of light signals.

For example, the optical connector BC provides pumping light of a certain wavelength to apply a non-linear amplification pattern to light fields passing through the respective photonic guiding unit(s) PGU. The photonic guiding units may include doping material(s) excitable by the pumping light (e.g. about/centered at 980 nm) to cause spontaneous secondary emission (about/centered at 1550 nm) resulting from relaxation of excited ions of the doping material(s) resulting in required amplification of the light signal.

The optical connector BC may include a weighting unit configured for applying weightings to the optical signals thereby applying a linear amplification pattern on the light fields.

Figure 6C:
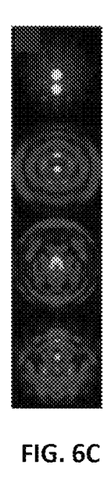
FIGS. 6C-6D show the mode propagation and crosstalk of two input signal combinations, demonstrating mixed signals across the output plane.
Figure 6D:
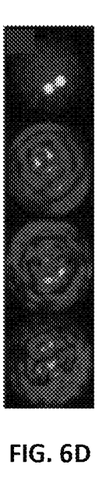

All single-mode fibers may be joined to a so-called multimode middle section (fan-in). The VOA-weighted input data may be mixed in the multimode middle section to generate the multiply-accumulate (MAC) operation. FIGS. 6C-6D show the mode propagation and crosstalk of two input signal combinations, demonstrating mixed signals across the output plane. FIG. 6C shows simulation of mode propagation along the multimode section with one input at the central core and one at the circumference, and FIG. 6D shows simulation of mode propagation along the multimode section with both inputs on the circumference.

Figure 6E:
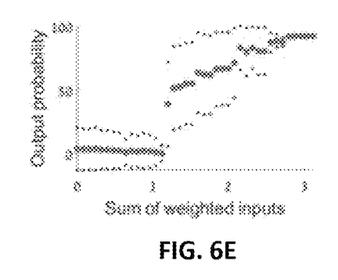
FIGS. 6E and 6F exemplify nonlinear activation functions that can be provided by the fiber amplifier.
Figure 6F:
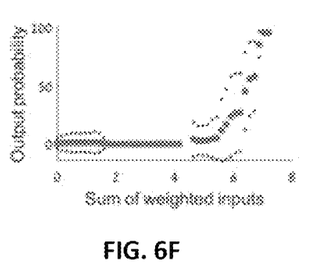

The nonlinear activation function in the computing unit BFB is provided by the fiber amplifier. In order to characterize the activation function, scanning was performed over all possible combinations of binary input data and weights, and the probability to receive a logical '1' at the output of the unit was calculated. The activation function was then drawn as the output probability versus the sum of weighted input. The type of activation function and its bias were fine-tuned using the amplification level of the EDFA. FIG. 6E shows a sigmoid-like activation function, and FIG. 6F shows a RelU-like activation function.

The inventors used the results of the multimode computing unit BFB to emulate a neuron in a ResNet Filter and then ResNet18 and ResNet50 neural networks and simulated these networks with the established benchmarks of ImageNet and KITTI. The performance of such multimode processor is illustrated in the following table:

|  | Photonic Guiding Units/Cores | Rate (K image/sec) | Accuracy @top5 | Power (KWatt) | Image/Watt |
|---|---|---|---|---|---|
|  | 431,750 | 500,000 | 89.9 | 45 | 11,100 |
| 3×R | 431,750 | 166,667 | 92.7 | 45 | 3,700 |
| Titan RTX x10 | 46,080 | 104 | 92.4 | 2.23 | 47 |

In the table, the notation 3×R stands for 3 repeats that were averaged for each test input. The accuracy of the system was 89.9-92.7%, a comparable result to state-of-the-art GPU card NVidia Titan RTX (97.3%-103% relative accuracy), with an acceleration of 1600-fold (task/second) and a 78-fold improved efficiency. The estimated performance of the simulated system is 6.67-105 TOPS and an efficiency of 14.8 TOPS/Watt.

As indicated above, the photonic guiding unit PGU suitable to be used in the processing unit of the invention may be based on an Er-doped fiber, in particular an Erbium doped multicore fiber (EDMF). It has been previously shown that the crosstalk between different cores can be controlled by the pumping of each core, and that under proper arrangement and weighting such fibers can act as a neural network [E. Cohen, D. Malka, A. Shemer, A. Shahmoon, Z. Zalevsky, and M. London, "Neural networks within multi-core optic fibers," Sci. Rep. 6, 29080 (2016)].

The inventors have manufactured an EDMF with similar methods to the multimode computing unit, by bundling and tapering Er-doped fibers. In this connection, reference is made to FIGS. 7A-7D exemplifying the configuration and operation of such EDMF computing unit 15.

Figures 7A, 7B:
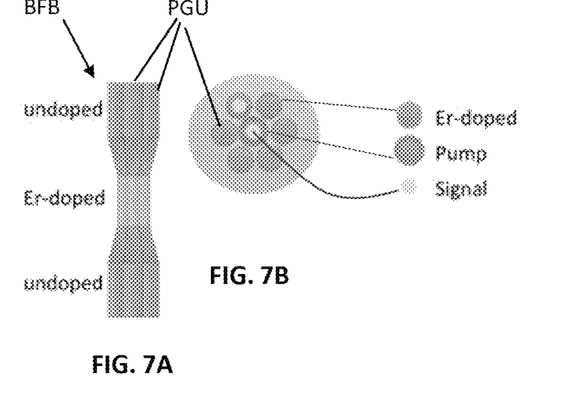
FIGS. 7A and 7B show, respectively, side view and cross-section of an example of the photonic body of the basic block.
Figure 7C:
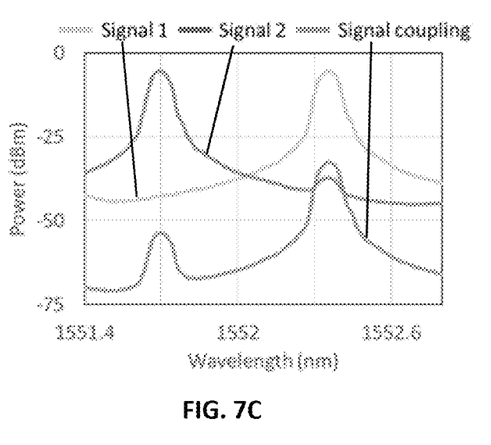
FIG. 7C shows spectra of the computing unit with and without coupling between different cores in the photonic body of FIGS. 6A-6B.
Figure 7D:
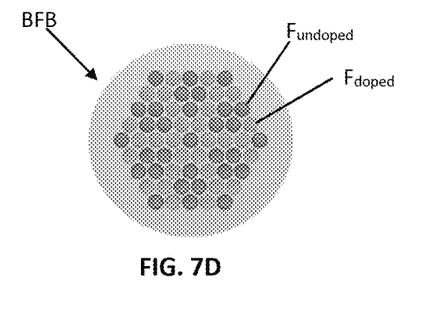
FIG. 7D shows another example of the EDMF based photonic body with network realized by core doping.

FIGS. 7A and 7B show, respectively, side view and cross-section of the photonic body containing an array of photonic guiding units having Er-doped portions/regions. FIG. 7C shows the spectra of the computing unit with and without coupling between different cores. To this end, the inventors inserted signals with wavelengths close to 1550 nm into the two cores and pumping with wavelength of 980 nm to one core, with different combinations, and measured the combined output spectrum. The output shows significant coupling between the two input signals. FIG. 7D shows the EDMF based computing unit BFB, with network realized by core doping. According to this network architecture, the computing unit includes many cores/photonic guiding units PGU formed by doped fibers $F_{doped}$ and undoped fibers $F_{undoped}$. Thus, in some embodiments, the fiber-based photonic computing units, which can serve as building blocks in an incoherent photonic neural network, may be formed by EDMFs or by a combination of EDMFs and undoped fibers. Such networks, while yet sizable (1-3 standard 19' communication racks), yields super-computing abilities and exhibit computational efficiency exceeding 1,000 TOPS/Watts with an accuracy comparable to state-of-the-art systems.

The invention claimed is:

1. A photonic computing system comprising:
   an arrangement of a predetermined number of multiple photonic processing units, each having its associated input and output ports and being configured and operable to implement one or more optical processing tasks, each of said photonic processing units comprising an array of photonic guiding units forming together a plurality of light field channels configured to define propagation conditions for multiple light fields associated with said one or more optical processing tasks; and
   a plurality of optical connectors, each of said optical connectors being configured as a light path for connecting the input and output ports for performing light field to light field coupling between the input and output ports of adjacent photonic processing units in said arrangement of the photonic processing units;
   said multiple photonic processing units with the optical connectors are arranged in a spaced apart parallel relationship forming together a processor panel configured as a hardware module of a network rack, such that each photonic processing unit, except for the photonic processing units at edges of the arrangement of the photonic processing units, is surrounded by other photonic processing units and communication of the photonic processing unit with all the surrounding photonic processing units for receiving from them or transmitting to them light carried information is provided via the optical connectors, said photonic computing system thereby providing a network of the multiple photonic processing units communicating between them via said optical connectors.

2. The system according to claim 1, wherein the optical connectors is configured as a U-shaped bridge connectors defining the light path for connecting the input and output ports of the adjacent photonic processing units of the processor panel.

3. The system according to claim 1, wherein said optical connectors comprise at least one optical connector configured for connecting the output port of one of the photonic processing units to the input port of the adjacent photonic processing unit.

4. The system according to claim 1, wherein said optical connectors comprise at least one optical connector configured for connecting the output port of one of the photonic processing units to the input ports of two or more of other of the photonic processing units.

5. The system according to claim 4, wherein said output port and input ports of the photonic processing units connected by said at least one optical connector comprise light splitting and coupling elements.

6. The system according to claim 1, wherein said one or more optical connectors comprise at least one optical connector configured for preserving one or more properties of the respective light field.

7. The system according to claim 6, wherein said one or more properties include at least one of light polarization and light spectral properties.

8. The system according to claim 1, wherein the one or more processing tasks being performed by the photonic processing unit are defined by amplification patterns controllably applied on the light fields.

9. The system according to claim 1, wherein said predetermined number of the photonic processing units is determined by a number of light propagating cores defined by the photonic guiding units.

10. The system according to claim 8, wherein the optical connector together with the respective input and output ports of the photonic processing units are configured and operable to apply the predetermined amplification patterns on the light fields.

11. The system according to claim 10, wherein the optical connector further comprises a local controller configured and operable to control the amplification pattern being applied and to control readout of output light.

12. The system according to claim 1, wherein the photonic processing unit comprises a photonic body configured to define two or more of said input ports and two or more of said output ports.

13. The system according to claim 12, wherein the photonic body has a hexagonal cross-section, whose facets are associated with the input and output ports.

14. The system according to claim 1, wherein the input ports comprise at least one input port comprising an input synchronizing unit comprising at least one of the following: a clock locking utility configured and operable to perform client-server clock locking; and a clock phase alignment utility configured and operable to perform optical clock-phase delay synchronization.

15. The system according to claim 1, wherein the input ports comprise at least one input port configured and operable to perform wavelength conversion.

16. The system according to claim 1, wherein the output ports comprise at least one output port configured and operable to perform output signal reshaping.

17. The system according to claim 1, wherein the photonic guiding units are configured to define the light fields of one or more of the following types: multimode light fields, multicore light fields defined by single-mode, multi-mode or combination of both light channels, light fields propagating through erbium doped cores, light fields propagating through photonic crystal fiber-based cores, light fields confined in 2D or 3D photonic crystals.

18. The system according to claim 1, wherein the photonic processing units comprise at least one photonic processing unit comprising a photonic lantern made by adiabatically merging several single-mode cores into one multimode core.

19. A network rack housing multiple hardware modules comprising one or more photonic computing systems, each configured as the system of claim 1.

20. A photonic computing system comprising:
an arrangement of a predetermined number of multiple photonic processing units having input and output ports, each of said photonic processing units comprising an array of photonic guiding units configured to define propagation conditions for multiple light fields associated with one or more optical processing tasks; and
a plurality of optical connectors, each of said optical connectors performing light field to light field coupling between the input and output ports of adjacent photonic processing units in said arrangement of the photonic processing units; said photonic computing system thereby providing a network of communicating processing units,
wherein the input ports comprise at least one input port comprising an input synchronizing unit comprising at least one of the following: a clock locking utility configured and operable to perform client-server clock locking; and a clock phase alignment utility configured and operable to perform optical clock-phase delay synchronization.

21. A photonic computing system comprising:
an arrangement of a predetermined number of multiple photonic processing units having input and output ports, each of said photonic processing units comprising an array of photonic guiding units configured to define propagation conditions for multiple light fields associated with one or more optical processing tasks; and
a plurality of optical connectors, each of said optical connectors performing light field to light field coupling between the input and output ports of adjacent photonic processing units in said arrangement of the photonic processing units; said photonic computing system thereby providing a network of communicating processing units,
wherein the photonic processing units comprise at least one photonic processing unit comprising a photonic lantern made by adiabatically merging several single-mode cores into one multimode core.

* * * * *